United States Patent Office 3,026,247
Patented Mar. 20, 1962

3,026,247
PHARMACEUTICAL PREPARATION
Robert Towner Hill, 4522 Rosedale Ave., Bethesda, Md.
No Drawing. Filed Dec. 17, 1957, Ser. No. 703,270
7 Claims. (Cl. 167—58)

My invention relates to compositions which are useful in combatting germicidal and fungicidal infections.

More particularly my invention relates to such compositions in which the active ingredient is an acid salt of certain acetates and acetic acid.

Heretofore potassium permanganate, phenoxyacetic acid, cadmium chloride, dichlorosalicylanilide have been used as fungicidal agents. None of these materials have proven completely satisfactory.

It is an object of this invention to provide a fungicidal agent for use on external parts of the body. This agent may be associated with a carrier which may be a salve, an ointment or a liquid.

It is another object of the invention to provide a germicidal agent that may be incorporated in a solid carrier for use in certain body cavities, such as vagina and external auditory meatus.

These and other objects of the invention will be apparent to one skilled in the art from the following description and examples which are given for the purpose of illustration, but which do not limit this invention, except insofar as the scope of the annexed claims.

It has been found that certain metallic acetates form acid salts with acetic acid. These salts have a definite molecular composition. Sodium acetate, acetic acid has the composition $CH_3COONa \cdot CH_3COOH$. This material is water soluble and maintains a constant pH of about 4.8, during its use. Similarly potassium acetate and acetic acid also form an acid salt, $CH_3COOK \cdot CH_3COOH$. This has proven satisfactory but is not the preferred material because potassium ions after continued use and in high enough concentrations become toxic to mammalian organisms. The sodium salt does not have these objectionable characteristics. Similarly the acid salts of ammonium acetate and acetic acid and lead acetate and acetic acid may be used in a manner corresponding to that described hereinafter for the preparation of germicidal and fungicidal compositions containing the acid salts of sodium acetate and acetic acid.

Whereas, the acid salts referred to above are one molecule of the metal salts and one molecule of the acid certain other acid salts are known and may be used. The sodium salts having one mol of the sodium acetate to 2 mols of the acid are also included within this invention, but the preferred embodiment of this invention is the acid salts having a ratio of 1 mol of sodium acetate to 1 mol of acid.

EXAMPLE 1

The following ingredients were used:

Sodium acetate, $CH_3COONa \cdot 3H_2O$ (certified reagent)
Acetic acid, RA tested purity (glacial reagent)
Methyl salicylate, U.S.P.
"Tween 80" (polyoxyethylene sorbitan monooleate) (manufactured by Atlas Products Company)
"Carbowax 4000" (polyethylene glycol) (manufactured by Carbide and Carbon Chemical Company)

1 gram molecular weight of sodium acetate is dissolved in the smallest reasonable amount of warm distilled water; 1 gram molecular weight of acetic acid is added thereto. Distilled water is then added to bring the total volume to such an amount that each milliliter will contain 500 milligrams of the compound

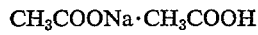

That is, 408 grams of sodium acetate,

180 grams of acetic acid, and distilled water to total volume of 852 cc. are mixed together.

500 grams of "Carbowax 4000" is melted in a beaker; 1 cc. of "Tween 80," and 0.255 cc. of methyl salicylate are added. 125 milliliters of the above sodium acetate, acetic acid solution are then added to the "Carbowax 4000" composition and agitated in a Waring Blendor. This material is then poured into a container to solidify. The mixture will then have the following composition:

"Carbowax 4000" (carrier) _____ 80% approximately by weight.
Sodium acetate (active ingredient) __ 5.8% approximately by weight.
Acetic acid (active ingredient) _____ 4.2% approximately by weight.
Distilled water (solvent) _____ 10% approximately by weight
"Tween 80" (wetting agent) _____ 0.16% approximately by volume.
Methyl salicylate (masking agent) __ 0.04% approximately by volume.

These active ingredients are hereinafter indicated in the following experiments as Compound 1608.

EXAMPLE 2

"Carbowax 1500" (carrier) _____grams__ 300
Distilled water (solvent) _____cc__ 200
"Stock" solution (containing 500 mg. sodium acetate-acetic acid per ml.) (active ingredient)__cc__ 125
"Tween 80" (wetting agent) _____cc__ 1
Methyl salicylate (masking agent) _____cc__ 0.25

Melt Carbowax, and add other ingredients, stir thoroughly. This will remain liquid at room temperature of 27° C.

When this material is used on an open cut or burn a topic anesthetic in the concentration of 1% may be added to relieve the irritation. Procaine, xylocaine and nupercaine have proven satisfactory.

EXAMPLE 3

"Carbowax 4000" (carrier) _____gr__ 500
Anhydrous sodium acetate (active ingredient)__gr__ 36.1
Glacial acetic acid (active ingredient) _____gr__ 26.5
"Tween 80" (wetting agent) _____cc__ 1
Methyl salicylate (masking agent) _____cc__ ¼
Distilled water (solvent) _____cc__ 62.5

Melt the "Carbowax 4000" and add the other ingredients. Allow to cool until turning slightly milky white, put in blender (Waring or other), and blend about 30 seconds. Allow to cool until stiffly firm and form into suppositories (normal shape or fluted to increase surface areas).

In the above examples "Carbowax 4000" has been used as a carrier. Other materials, such as fat bases used in the preparation of face cream and lanolin can be used in place of the "Carbowax." The "Carbowax" is the preferred material because the active agent is not fat soluble.

A 50% aqueous solution of sodium acetate, acetic acid, $CH_3COONa \cdot CH_3COOH$, was diluted to the following concentrations:

| Percent Solution of 1608 | 1 | 0.5 | 0.25 | 0.12 | 0.08 | 0.06 | 0.05 | Control |
|---|---|---|---|---|---|---|---|---|
| Dilutions of 1608 | 1:100 | 1:200 | 1:400 | 1:800 | 1:1,200 | 1:1,600 | 1:2,000 | Control |
| M. aureus (stasis or cidal) | − | − | + | + | + | + | + | + |
| 24 hr. subculture (cidal) | − | + | + | + | + | + | + | + |
| M. aureus serum euridment | − | − | + | + | + | + | + | + |
| 24 hr. subculture | − | + | + | + | + | + | + | + |
| Salmonella typhosa | − | + | + | − | + | + | + | + |
| 24 hr. subculture | − | − | + | + | + | + | + | + |
| Salmonella typhosa+ serum | − | − | + | + | + | + | + | + |
| 24 hr. subculture | − | − | ± | + | + | + | + | + |
| T. mentagrophytes | − | − | + | + | + | + | + | + |
| 1 day subculture | + | + | + | + | + | + | + | + |
| 4 day subculture | − | − | + | + | + | + | + | + |
| 6 day subculture | − | − | + | + | + | + | + | + |
| T. mentagrophytes+ serum | − | − | + | + | + | + | + | + |
| 1 day subculture | + | + | + | + | + | + | + | + |
| 4 day subculture | + | + | + | + | + | + | + | + |
| 6 day subculture | − | + | + | + | + | + | + | + |

It is clearly indicated that in very dilute solutions (1%, 0.5%) the killing activity of 1608 is most effective. It is further evident that the presence of serum possesses very little if any neutralizing action on 1608. These tests portray the fact that 1608 is effective on long exposure time and that time is an essential factor for the killing influence.

1608 was tested against standard culture in sterile tubes as follows:

BACTERICIDAL TEST (APPROVED LABORATORY TECHNIQUE, BY KOLMER, SPALDING AND ROBINSON, PUBLISHED BY APPLETON CENTURY CO.)

(1) Pipetted 4.5 ml. of desired dilution into sterile tubes. Added 0.5 ml. of desired culture. Transferred to recovery broth at designated intervals.

(2) Incubated recovery tubes for 4 days and streaked in doubtful tubes to solid media.

*M. aureus*

| Time | Compound 1608—Dilutions | | | | | | |
|---|---|---|---|---|---|---|---|
| | 1:10 | 1:20 | 1:40 | 1:80 | 1:100 | 1:200 | Control |
| 16 hrs | + | + | + | + | + | + | + |
| 22 hrs | − | + | + | + | + | + | + |
| 24 hrs | − | − | + | + | + | + | + |
| 40 hrs | − | − | + | + | + | + | + |
| 48 hrs | − | − | − | + | + | + | + |
| 64 hrs | − | − | − | − | + | + | + |
| 72 hrs | − | − | − | − | + | + | + |

*Salmonella typhosa*

| Time | 1:10 | 1:20 | 1:40 | 1:80 | 1:100 | 1:200 | Control |
|---|---|---|---|---|---|---|---|
| 30 mins | + | + | + | + | + | + | + |
| 1 hr | − | + | + | + | + | + | + |
| 2 hrs | − | − | + | + | + | + | + |
| 4 hrs | − | − | − | − | + | + | + |
| 6 hrs | − | − | − | − | − | + | + |
| 8 hrs | − | − | − | − | − | − | + |
| 16 hrs | − | − | − | − | − | − | + |
| 18 hrs | − | − | − | − | − | − | + |
| 20 hrs | − | − | − | − | − | − | + |
| 24 hrs | − | − | − | − | − | − | + |

*T. mentagrophytes*

| Time | Dilutions of Compound 1608 | | | | | | |
|---|---|---|---|---|---|---|---|
| | 1:10 | 1:20 | 1:40 | 1:80 | 1:100 | 1:200 | Control |
| 4 hrs | + | + | + | + | + | + | + |
| 24 hrs | − | + | + | + | + | + | + |
| 34 hrs | − | + | + | + | + | + | + |
| 50 hrs | − | − | + | + | + | + | + |
| 72 hrs | − | − | + | + | + | + | + |

The formula as described in Example 2 for a liquid was used on ten patients having an ear fungus infection. Several of these patients were completely cured within eight to ten days. Nine patients having pruritus ani were treated with the ointment prepared in accordance with Example 1, six of these patients were completely cured within three days, the other three patients had complications caused by internal hemorrhoids. Three cases of varicose ulcers were treated, two of which were completely healed. Ten cases of fungus infection of the body and feet were treated with the ointment prepared in accordance with Example 1, seven of these cases responded rapidly to this treatment. All showed improvement within seven to fourteen days. The ointment was applied twice daily and continued after active symptons disappeared. Two cases of fungus of umbilicus were treated with the ointment; these cases responded rapidly within five days. One case of a woman having a secondary infection was treated with the ointment which gave excellent results. Three cases of fungus infection of the groin were also treated with the ointment and responded rapidly giving good results. One patient having a tar burn, which became secondarily infected, was treated with the ointment and responded rapidly, the secondary infection completely clearing up and the burn healing rapidly.

It is to be understood that the invention is not limited to the specific compositions herein described by their examples; it may be embodied in other forms without departure from the spirit of this invention which is only limited by the claims annexed hereto, wherein what is claimed is:

1. A method of combatting fungicidal infections which comprises, administering a composition comprising more than 0.5% of a solution of the acid salts of sodium acetate and acetic acid, having at least one mol of acetic acid for each mol of sodium acetate to a mammalian host infected with a fungus.

2. A method of combatting fungicidal organisms which comprises, subjecting said organisms to a composition containing more than 0.5% of a member selected from the group consisting of acid salts of sodium acetate and acetic acid, the acid salt of potassium acetate and acetic acid, the acid salt of ammonium acetate and acetic acid, and the acid salt of lead acetate and acetic acid, said acid salt containing at least one mol of acetic acid for each mol of normal acetate.

3. A composition for combatting germicidal and fungicidal infections, which comprises, a carrier, 80 parts to 500 parts; sodium acetate acetic acid salt, having at least one mol of acetic acid to each mol of sodium acetate, said combination comprising 5.2 parts to 10 parts; water, 6 parts to 10 parts, and a wetting agent about 0.001 part.

4. A non-toxic, non-poisonous preparation for the treatment of an infected host, the active ingredient of which is a water solution of the acetic acid salts of sodium acetate containing at least one mol of acetic acid per mol of sodium acetate, the concentration of the acid salt of sodium acetate being more than 0.5% of the total composition.

5. A method of treating infection of the external auditory meatus which comprises applying to said area a solution of the acetic acid salts of sodium acetate containing at least one mol of acetic acid per mol of sodium acetate, the concentration of the acetic acid salt of sodium acetate being more than 0.5% of the total composition.

6. A method of treating lesions, which comprises applying thereto a solution of the acetic acid salts of sodium acetate containing at least one mol of acetic acid per mol of sodium acetate, the concentration of the acetic acid salt of sodium acetate being more than 0.5% of the total composition.

7. A method of rendering the vaginal tract, organism free, which comprises, extended contact of this area with a solution of the acetic acid salts of sodium acetate containing at least one mol of acetic acid per mol of sodium acetate, the concentration of the acetic acid salt of sodium acetate being more than 0.5% of the total composition.

References Cited in the file of this patent

UNITED STATES PATENTS 2,217,905    Hoffman  ---------------- Oct. 15, 1940

OTHER REFERENCES

Hospital Formulary of Selected Drugs, August 1954, p. 622.

Frazier et al.: A Formulary for External Therapy of the Skin, Chas. Thomas Publ., Spld., Ill. (1954), pp. 38, 42–46.

Atlas: Guide to the Use of Sorbitol and Surfactants in Cosmetics, Bulletin CD-93A-15M-11-56 (November 1956), pp. 14–15.

Harry: Cosmetic Materials, vol. II, Leonard Hill Ltd., London (1950), pp. 200–201.

Grunberg: Yale J. of Biology and Medicine, vol. 19, No. 5, May 1957, pp. 855–876, esp. at p. 875.

Nielson: J.A.M.A., vol. 102, No. 14, p. 1179 (April 7, 1934).

Messina: J.A.M.A., November 15, 1941, p. 1750.